United States Patent [19]

Langecker

[11] Patent Number: 4,849,143

[45] Date of Patent: Jul. 18, 1989

[54] METHOD OF INJECTION MOLDING OF THERMOPLASTIC MATERIALS USING THE OPTIMUM INJECTION FLOW RATE PATTERN

[75] Inventor: Günter Langecker, Meinerzhagen, Fed. Rep. of Germany

[73] Assignee: Battenfeld GmbH, Fed. Rep. of Germany

[21] Appl. No.: 120,356

[22] Filed: Nov. 13, 1987

[30] Foreign Application Priority Data

Nov. 17, 1986 [DE] Fed. Rep. of Germany ....... 3639292

[51] Int. Cl.$^4$ ............................................. B29C 45/76
[52] U.S. Cl. .................................. 264/40.1; 364/476; 425/135; 425/162
[58] Field of Search ................... 264/40.1, 40.3, 40.6, 264/40.7; 164/155; 364/148, 152, 473, 474, 476, 173, 477, 164; 425/135, 143, 144, 149, 150, 157, 159, 160, 170, 171, 451.2, 155, 156, 162

[56] References Cited

U.S. PATENT DOCUMENTS

| | | | |
|---|---|---|---|
| 4,195,048 | 3/1980 | Jung | 264/40.5 |
| 4,695,237 | 9/1987 | Inaba | 425/171 |
| 4,696,632 | 9/1987 | Inaba | 425/171 |

FOREIGN PATENT DOCUMENTS

| | | | |
|---|---|---|---|
| 3407040 | 8/1984 | Fed. Rep. of Germany | 364/476 |
| 3524310 | 6/1986 | Fed. Rep. of Germany | |
| 60-24915 | 2/1985 | Japan | 264/40.1 |
| 61-53020 | 3/1986 | Japan | 364/476 |
| 6322 | 11/1986 | PCT Int'l Appl. | 364/476 |

*Primary Examiner*—Jan H. Silbaugh
*Assistant Examiner*—Jill L. Heitbrink
*Attorney, Agent, or Firm*—Toren, McGeady & Associates

[57] ABSTRACT

A method of injection molding thermoplastic material from an injection molding machine including a slidable screw into a mold whose optimum pattern of the injection rate has been determined on and is known for another injection molding machine. The method includes transferring the defined optimum characteristic values for a first injection molding machine onto a second injection molding machine. The known optimum injection flow rate pattern ($V_A$) of a previously used first injection molding machine is introduced manually and/or by means of data carriers into a control device of a second injection molding machine to be used. The second injection molding machine is operated with any compatible injection flow rate pattern ($V_b$), with the resulting injection time ($t_{Eb}$) being adjusted to that of the first injection molding machine by means of a multiplicative change of the injection flow rate pattern. Forming an adjustment factor $K_V = \overline{V}_b/\overline{V}_A$ as the quotient of the average integral injection flow rate patterns. Finally, the optimum injection flow rate pattern ($V_B(t)$) of this injection molding machine is formed in the control device of the second injection molding machine is formed in the control device of the second injection molding machine for the mold to be filled by means of the calculation $V_B(t) = K_V \cdot V_A(t)$ and developing by means of another calculation from $V_B(t)$ the corresponding injection distance pattern ($V_B(s)$).

7 Claims, 1 Drawing Sheet

METHOD OF INJECTION MOLDING OF THERMOPLASTIC MATERIALS USING THE OPTIMUM INJECTION FLOW RATE PATTERN

BACKGROUND OF THE INVENTION

1. Field of the Invention

The present invention relates to a method of injection molding thermoplastic materials from an injection molding machine including a slidable screw into a mold whose optimum pattern of the injection flow rate has been determined on and is known for another injection molding machine. The method includes transferring the defined optimum characteristic values for a first injection molding machine onto an injection molding machine to be used.

2. Description of the Prior Art

In a flexible injection molding operation, frequent mold changes are required. However, for another lot size, not always the same injection molding machine is available on which the favorable characteristic values have already been determined, particularly the optimum injection flow rate pattern. Rather, from the number of injection molding machines which are available at a given time, that machine which is most advantageous for a given purpose is selected. If the given mold is then used on another injection molding machine, usually the injection procedure must again be optimized in order to obtain molded articles having the same properties. These properties are usually influenced by the mold filling procedure, the afterpressure procedure, the material temperature and the like. By determining the optimum mold filling procedure for a first injection molding machine, a defined screw advancing and injection flow rate pattern is obtained. If the same mold is now used on another injection molding machine, it is necessary to determine an equivalent injection flow rate pattern which will result in the same optimum mold filling procedure for this particular mold.

After the mold filling procedure has been concluded, the afterpressure phase is initiated. The shift from injection procedure to the application of afterpressure may be carried out as a function of distance, time or pressure. Independently of the type of parameter chosen for carrying out the shift, the mold-related injection time or mold filling time is always the correct physical reference value.

It is known in the art to introduce the rate of injection along the travel distance of the screw into a control device and, if necessary, to provide a graphic representation of the rate of injection. Since this control is carried out as a function of time, the injection rate/distance pattern of the screw advancement can always be represented and processed without great difficulty as an injection rate/time pattern.

In a method known from German patent No. 3,524,310, a screw travel distance/time curve with the mold-related injection time is stored and, by standardizing the travel distance units, a conversion to optimum values for another machine is possible. However, the method of this German patent is relatively complicated and the control of the method is relatively difficult.

It is, therefore, the primary of the present invention to provide a method of determining in a quick, simple and automated manner, based on the optimum characteristic values determined for a given mold on a first machine, the corresponding optimum characteristic values for operating the mold on a second machine.

SUMMARY OF THE INVENTION

In accordance with the present invention, the known optimum injection flow rate pattern ($V_A$) of a previously used first injection molding machine is introduced manually and/or by means of data carriers into a control device of a second injection molding machine to be used. The second injection molding machine is operated with any compatible injection flow rate pattern ($V_b$), with the resulting injection time ($t_{Eb}$) being adjusted to that of the first injection molding machine by means of a multiplicative change of the injection flow rate pattern. Forming an adjustment factor $K_V = \overline{V}_b/\overline{V}_A$ as the quotient of the average integral injection flow rate patterns. Finally, the optimum injection flow rate pattern ($V_B(t)$) of this injection molding machine is formed in the control device of the second injection molding machine for the mold to be filled by means of the calculation $V_B(t) = K_V \cdot V_A(t)$ and developing by means of another calculation from $V_B(t)$ the corresponding injection distance pattern ($V_B(s)$).

The method according to the present invention has the particular advantage that the optimum injection flow rate pattern $V_B(t)$ can be determined quickly and can be obtained in a virtually fully automated manner. If the injection time changes for any reason, the entire injection flow rate pattern can be adjusted by a multiplication through only a single correcting factor until the optimized injection time is again reached. As a result, not only a short time for setting up the injection molding machine provided with the mold is required, the found optimum values can also be easily maintained, even if interfering values appear and/or changes of operating values occur.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

For the purposes of the following description, it is assumed that a certain mold has already been used on an injection molding machine A and that the optimum characteristic values have been determined for this injection molding machine A, particularly the injection flow rate pattern and the injection time. It is further assumed that this mold is now to be used on another injection molding machine B which has different properties. Since a separate determination of the optimum characteristic values is relatively complicated and time-consuming, it is desirable to start from the values determined in connection with injection molding machine A. The following procedure has bee found to be useful for carrying out this object:

Initially, the optimized injection flow rate pattern $V_A(t)$ which has been determined in connection with injection molding machine A is introduced into the control device of injection molding machine B. This injection flow rate pattern can be introduced manually, however, it is simpler to introduce the pattern by means of data carriers.

Simultaneously, the mold is filled utilizing any chosen injection flow rate pattern of machine B and the injection time $t_{Eb}$ is determined for this pattern. It is merely necessary to ensure that the chosen injection flow rate pattern is compatible with the injection molding machine and with the mold, so that the machine and the mold are not endangered. However, particularly simple conditions result from using a constant flow rate pattern. The used pattern is then adjusted by multiplicative changes until the same injection time $t_{EB}$ is obtained which was present during the operation of the injection molding machine A in the form of injection time $t_{EA}$. If a constant injection flow rate pattern is used, the multiplicative changes result as the ratio of the obtained injection times $t_{Eb}/t_{EA}$, so that further approximation steps are not required.

From the two existing injection flow rate patterns, i.e., the optimum injection flow rate pattern of injection molding machine A and of the presently used injection molding machine B, the average integral injection flow rates $\bar{V}_A$ and $\bar{V}_B$, respectively, are now formed. In the case of the given injection flow rate pattern, this pattern can already be obtained in the injection molding machine A by means of the control device of machine A. The determination is made simpler during the initial filling of the mold in connection with injection molding machine B if a constant flow rate pattern has already been used.

A flow rate adjustment factor $K_V$ can now be determined from the two average integral injection flow rates $\bar{V}_A$ and $\bar{V}_B$ as follows:

$$K_V = \bar{V}_b / \bar{V}_A$$

Figure 1:
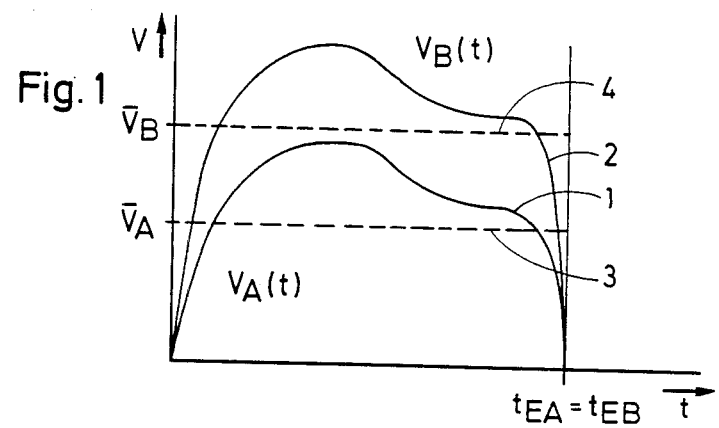
FIG. 1 shows injection flow rate patterns as a function of time.

The optimized injection flow rate pattern for injection molding machine B can now easily be determined by using the following equation $V_B(t) = K_V \cdot V_A(t)$. For transferring the pattern into the machine control, it is advantageous to determine another conversion from $V_B(t)$ to $V_B(s)$. Thus, a flow rate adjustment factor has been determined by means of relatively few steps which can be carried out by the control device of the machine with only little help. This flow rate adjustment factor is used for converting the original optimized injection flow rate patterns for use in the injection molding machine which is now employed. In addition, it is easily possible, if interfering influences occur, to keep the injection time constant by slightly varying this flow rate adjustment factor. FIG. 1 of the drawing shows the injection flow rate pattern 1 which has been determined in connection with injection molding machine A and injection flow rate 2 to be determined for use in connection with injection molding machine B. In both cases, curves 3 and 4 show in broken lines the average integral injection flow rates $/_A$ and $/_B$ the quotient of which results in the flow rate adjustment factor $K_V$.

By multiplying the injection flow rate pattern $V_B(t)$ of curve 2 with this adjustment factor $K_V$, curve 2 becomes curve 1 and the desired injection flow rate pattern for machine B has been found.

However, in practice, the injection time $t_{Eb}$ determined within an injection cycle may deviate in a production series from the given injection time $t_{Eb}$. The reasons for this may be modified material properties, slight variations in temperature, or other parameters. Advantageously, a control device is provided which carries out an adjustment to certain predetermined values, for example, by slight variations of the injection flow rate pattern with a factor which is close to value 1. In this case, as is true for the determination of the afterpressure phase, the injection time or the beginning and the end of the mold filling procedure must be clearly determined. Several possibilities exist for this determination.

The first of these possibilities starts from the fact that practically any controlled injection molding machine includes a travel distance/time signal transmitter which can be used to obtain a representation of the travel distance/time curve of the mold filling procedure. Such a curve is illustrated as an example in the diagram of FIG. 2. Portion 5 of this curve represents the constant position of the screw up to the beginning of the mold filling procedure. In order to fill the mold, the screw is shifted axially, resulting in a dropping curve portion 6 between the beginning $t_s$ and the end $t_f$ of the mold filling time. After the mold has been filled, the screw is not moved further or, as determined by leakage losses, is shifted only to such a slight extent that a curve portion 7 of practically constant amplitude results during the afterpressure time. The abscissae $t_s$ and $t_f$ are distinguished by the fact that the inclination of the curve changes relatively instantaneously in these points. In the point corresponding to the time $t_s$ the inclination is negative, and in the point corresponding to the time $t_f$, the inclination extends toward zero.

Figure 2:
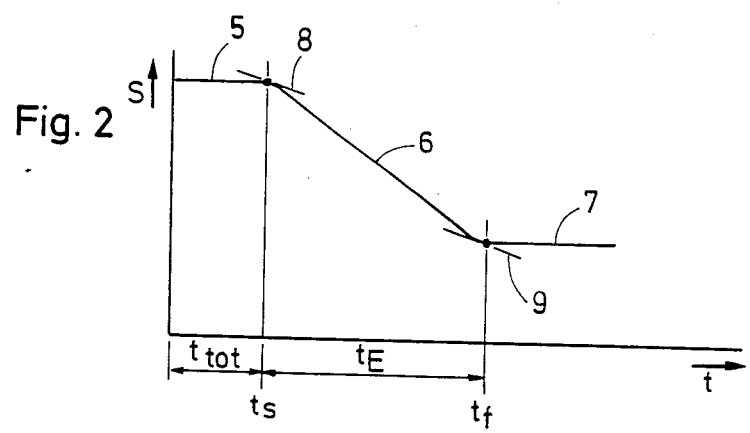
FIG. 2 shows the mold filling procedure as a function of the screw travel distance.

Accordingly, the differentiation of travel distance with respect to time can be determined from the signals provided by the travel distance/time signal transmitter. By monitoring this differentiation, the time $t_s$ of the beginning of the mold filling procedure can be determined when the differentiation is below a predetermined negative threshold value. The end $t_f$ of the mold filling time is obtained when another negative threshold value is exceeded. It is useful to have the differentiation follow a negative threshold value which is not too slow, and to subsequently have it exceed a threshold value because, due to leakages or compressibility, slight inclinations may exist even before the actual procedure of filling the mold has begun. For clarity's sake, FIG. 2 shows these threshold values of the inclination excessively large. The inclinations are represented by tangents 8 and 9 of the curve at the times $t_s$ and $t_f$.

Figure 3:
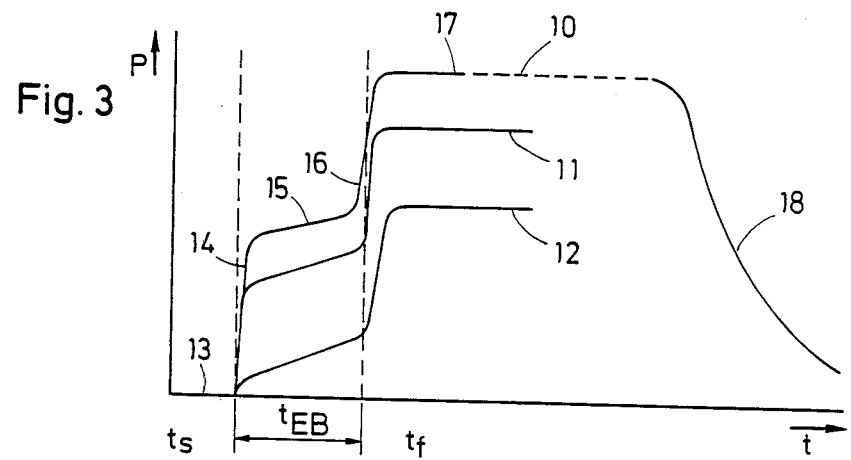
FIG. 3 is a diagrammatic representation of the pressure conditions occurring during the filling of the mold.

However, there are other possibilities for exactly determining the beginning and the end of the injection time. For example, it is possible to monitor the pressure occurring during injection molding by means of a pressure signal transmitter. This pressure signal transmitter may be connected to the hydraulic cylinder of the injection unit and measures the driving pressure. The pressure signal transmitter may also be connected to or accommodated in the nozzle head and may record the pressure existing in the nozzle head. The transmitter may also be provided near the sprue at or in the mold itself and may determine the pressure occurring near the sprue in the mold cavity or the sprue duct. The results of the measurements taken by the pressure signal transmitters including the afterpressure are diagrammatically illustrated in FIG. 3, wherein the curve 10 shows the pressures indicated by a transmitter arranged at the hydraulic cylinder of the injection unit, curve 11 shows the pressures indicated by a transmitter arranged in the nozzle head, and curve 12 shows the pressures indicated by a transmitter mounted near the sprue in the mold.

The conditions which actually occur shall be explained with respect to curve 10. A practically pressureless curve portion 13 results prior to the filling of the mold. At the beginning of injection, initially the absolute value of the pressure increases substantially and with a steep inclination, until a stationary phase of the filling of the mold occurs in portion 15 during which the pressure only rises slightly. When the filling of the mold has been concluded, another steep, substantial pressure rise occurs in curve portion 16 until the afterpressure is reached. This afterpressure is initially constant as represented by curve portion 17 and then, after a predetermined cooling time, drops asymptotically towards zero as indicated by curve portion 18.

It is possible to determine the beginning $t_s$ and the end $t_f$ of the injection time $t_{EB}$ when predetermined pressure potentials are exceeded. The beginning of the injection time occurs when a first, relatively low pressure threshold is exceeded and the end of the injection time occurs when a substantially higher pressure threshold is exceeded. However, it is also possible to determine in the microcomputer of the control device the differentiations of the pressure with respect to time and to consider as the criterion of the beginning $t_s$ when a first steepness threshold is exceeded. The criterion for the end $t_s$ results either from considering the combination of when a second steepness threshold is exceeded in connection with when a higher pressure potential is reached, or by determining when a second steepness threshold has been exceeded after passing through a steepness minimum.

The time $t_{Eb}$ of the injection procedure and, thus, the mold filling time results from the difference of the times measured by means of one of the above methods. Time $t_f$ additionally indicates the beginning of the afterpressure.

The injection time is initially taken as a given value from the injection molding machine A and, as described above, the optimum injection flow rate pattern of machine A is adjusted by means of adjustment factor $K_V$ to that of machine B, so that the same injection times result. However, during the start up time as well as during the operation, the beginning and the end of the injection time and, thus, the duration of the injection time, are continuously monitored. By an appropriate control, this injection time is kept constant. Accordingly, if during an injection cycle an injection time is measured which is too long, the injection flow rate pattern is slightly increased by multiplication for the following cycle, so that the time difference which has occurred is eliminated during the next cycle. In the same manner, if the mold is being filled too quickly, the injection flow rate pattern is slightly decreased by multiplication for the next cycle, so that the time difference which has occurred is again compensated and the predetermined injection time is ensured for the following cycle. As a result, conditions which have once been transferred and determined, can be ensured over long operating periods and optimum injection molded articles can be obtained.

While a specific embodiment of the invention has been shown and described in detail to illustrate the application of the inventive principles, it will be understood that the invention may be embodied otherwise without departing from such principles.

I claim:

1. A method of injection molding thermoplastic materials from an injection molding machine including a slidable screw, the thermoplastic material being injected into a mold whose optimum injection flow rate pattern (t) has been determined on and is known from a first injection molding machine, wherein defined optimum characteristic values obtained from the first injection molding machine are transferred to a second injection molding machine and used for determining an optimum injection flow rate pattern $V_B(t)$ of the second injection molding machine for said mold, comprising (a) introducing manually and/or by means of data carriers the known optimum injection flow rate pattern $V_A(t)$ of the previously used first injection molding machine into a control device of the second injection molding machine, (b) operating the second injection molding machine with any compatible injection flow rate pattern $V_b(t)$, then a resulting injection time $t_{Eb}$ from the operation of the second injection molding machine being adjusted to an injection time $t_{EA}$ of the optimum injection molding machine by means of a multiplicative change of the compatible injection flow rate pattern $V_b(t)$, so that $t_{EA} = t_{Eb}$, (c) calculating an adjustment factor K as the quotient of an average compatible integral injection flow rate $\overline{V}_b$ of the second injection molding machine and an average optimum integral injection flow rate $\overline{V}_A$ of the first injection molding machine, so that $K_v = \overline{V}_b / \overline{V}_A$, and (d) calculating in the control device of the second injection molding machine the optimum injection flow rate pattern $V_B(t)$ of the second injection molding machine for the mold to be filled by means of the calculation $V_B(t) = K_V \cdot V_A(t)$ and developing by means of another calculation from $V_B(t)$ a corresponding injection distance pattern $V_B(s)$.

2. The method according to claim 1, comprising determining a beginning time and an end time of the injection time $t_{EB}$ for the second injection molding machine by means of a travel distance/time signal transmitter of the second injection molding machine by calculating the differentiations of the screw travel distance with respect to time $ds/dt$ and determining the beginning time $t_s$ as the time when the differentiation drops for the first time below a first threshold value $-a_1$ and the end time $t_f$ as the time when the differentiation exceeds for the first time a second threshold value $-a_2$.

3. The method according to claim 1, comprising measuring a beginning time $t_s$ and an end time $t_f$ of the injection time $t_{EB}$ for the second injection molding machine by means of a pressure signal transmitter acted on by the thermoplastic material, by determining the beginning time $t_s$ a the time when a first predetermined pressure threshold $p_1$ is exceeded and the end time $t_f$ as the time when a higher second threshold value $p_2$ is exceeded for the first time.

4. A method according to claim 1, comprising measuring a beginning time $t_s$ and an end time $t_f$ of the injection time $t_{EB}$ of the second injection molding machine by means of a pressure signal transmitter which is capable of determining the differentiation of the pressure with respect to time dp/dt, wherein the beginning time $t_s$ is the time when a first threshold value of the differentiation of the pressure with respect to time dp/dt is reached and the end time $t_f$ is determined when a higher second threshold value of the differentiation of the pressure with respect to time dp/dt is exceeded.

old value of the differentiation of the pressure with respect to time dp/dt is exceeded.

5. The method according to claim 4, wherein the pressure signal transmitter is connected to a hydraulic cylinder for controlling the travel distance of the screw.

6. The method according to claim 4, wherein the pressure signal transmitter is mounted in a nozzle head of the injection molding machine.

7. The method according to claim 4, wherein the pressure signal transmitter is mounted in the mold.

* * * * *